United States Patent

[11] 3,603,531

| [72] | Inventor | Kurt Brücker-Steinkuhl<br>Fullenbachstrasse, Dusseldorf-Nord, Germany |
|---|---|---|
| [21] | Appl. No. | 781,091 |
| [22] | Filed | Dec. 4, 1968 |
| [45] | Patented | Sept. 7, 1971 |
| [32] | Priority | Dec. 8, 1967 |
| [33] | | Germany |
| [31] | | P 15 31 497.3 |

[54] METHOD AND APPARATUS FOR SPATIAL PROPORTIONAL NAVIGATION
9 Claims, 6 Drawing Figs.

[52] U.S. Cl. ................................................... 244/3.16
[51] Int. Cl. ....................................................... F41g 9/00,
F41g 7/00, F41g 7/18
[50] Field of Search ............................................ 244/3.16

[56] References Cited
UNITED STATES PATENTS

| 2,792,190 | 5/1957 | Siebold | 244/3.16 |
| 3,028,119 | 4/1962 | Coble | 244/3.16 X |
| 3,206,144 | 9/1965 | Welti | 244/3.16 |
| 3,216,614 | 11/1965 | McLean | 244/3.16 |
| 3,242,339 | 3/1966 | Lee | 244/3.16 |

Primary Examiner—Benjamin A. Borchelt
Assistant Examiner—Thomas H. Webb
Attorney—Krafft & Wells ABSTRACT: A method of spatial proportional navigation in which the angular velocity of the velocity vector of the steerable body is proportional to the angular velocity of the line of sight and an apparatus for carrying out the method wherein the position and direction of the angular velocity vector is chosen in such a manner that the plane of rotation of the velocity vector of the steerable body or of the steerable body itself contains the velocity vector $V_2^*$ of the collision or constant bearing course, and that the actual course is pursued with the least possible positioning in the collision course.

INVENTOR
KURT BRÜCKER-STEINKUHL
BY  Krafft & Wells
ATTORNEYS

INVENTOR
KURT BRÜCKER-STEINKUHL

BY Krafft & Wells
ATTORNEYS

METHOD AND APPARATUS FOR SPATIAL PROPORTIONAL NAVIGATION

BACKGROUND OF THE INVENTION

The field of the invention is aeronautics, missile stabilization and trajectory control by automatic guidance with attitude control mechanisms.

The state of the prior art may be ascertained by reference to U.S. Pat. No. 3,223,357 of Brücker-Steinkuhl; "Missile Guidance" by C. Clemow, Temple Press, London in chapter 2 on "Homing," particularly pages 38–43, and 58–60; "Guidance" by Arthur S. Locke, Van Nostrand Co., Princeton, N.J. in the sections "Proportional Navigation" at pages 475–478, and "Rate Gyroscopes" at pages 350–353; "Missile Guidance" by three-dimensional Proportional "Navigation," by F. Adler, in the Journal of Applied Physics, Vol. 27 (1956), beginning at page 500; and "Fundamentals of Advanced Missiles" by Richard B. Dow, New York (1958), beginning at page 31.

The invention relates to a steering method for spatially steering bodies, by which the angular velocity of the velocity vector of the steered body is proportional to the angular velocity of the line of sight. It relates especially to the suitable recording of the variable spatial events in the plane in which the rotation of the steerable body is effected.

Spatial steering methods differ from planar steering methods in that the turning of the steered body does not occur in a fixed plane of rotation, but in a plane which occupies different positions in space. Besides the amount of turning of the steered body, it will then also be necessary to determine the direction in which the rotation occurs.

For the solution of this important and complicated problem only few suggestions have been offered. In the work of F. Adler cited above, the problem of spatial steering has been stated to be the direct transfer of the actual path vector of the steered body to the collision course vector. Although the problem was there correctly stated, no general and exact solution was offered. Instead there have been only approximate solutions offered which are applicable only in cases where the actual path vector does not deviate greatly from the corresponding collision course vector. In reality, however, the initial errors and target path maneuvers frequently result in strong deviation of the actual path from the corresponding collision path, so that such approximations are not adequate to meet practical requirements.

There has also been prescribed for a steered body a transverse acceleration which imparts to the body a turning movement in a plane that is defined by the velocity vector $V_2$ of the steered body and the lateral velocity $W_r$ of the line of sight. This plane, however, does not coincide with the plane of rotation in which the actual path vector is transferred directly to the corresponding collision course vector. Furthermore, this prescription also does not take into consideration the angular velocity vector which is practically necessary.

The above suggestions are inadequate in not being applicable with precision in all cases for solving this problem.

SUMMARY OF THE INVENTION

In the present invention the plane of rotation of the velocity vector $V_2$ of the steered object is determined in such a manner that it will always contain the actual path vector and the corresponding collision course vector, and will therefore provide an exact universally applicable and practical solution of the problem of transferring the actual path vector directly to the corresponding collision course vector.

BRIEF DESCRIPTION OF THE PREFERRED EMBODIMENTS

Figure 1:
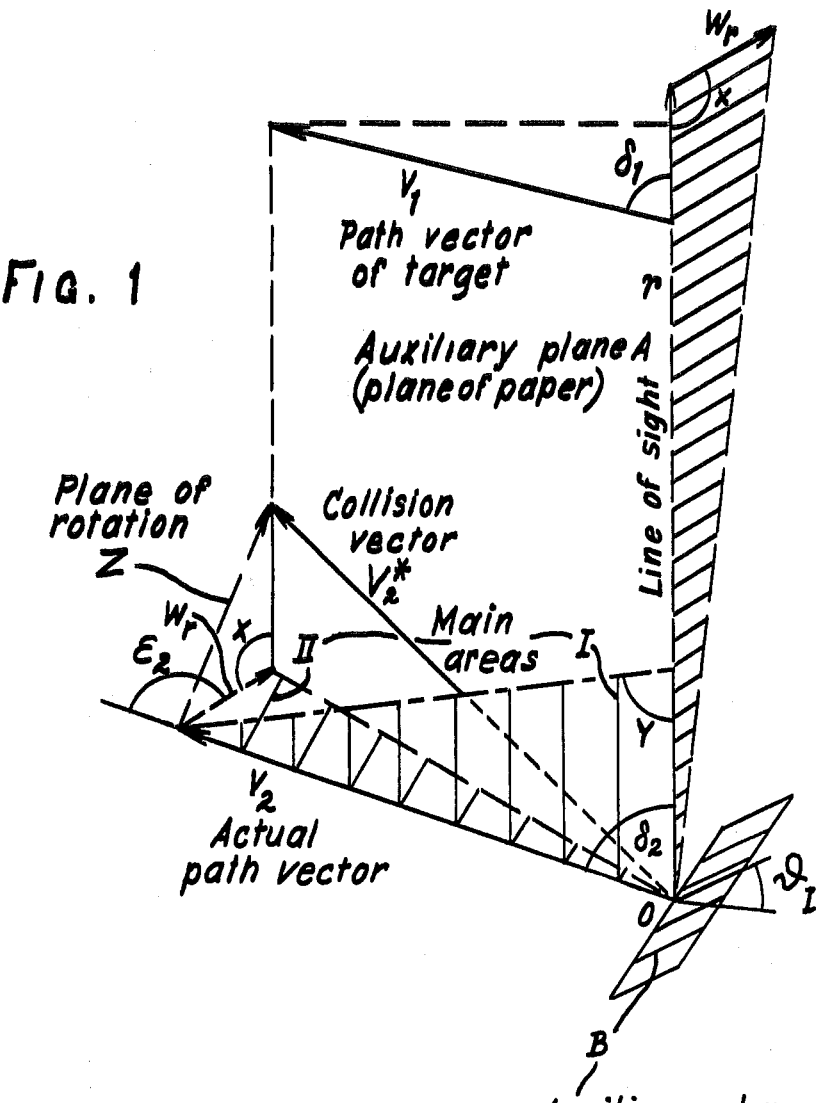
FIG. 1 is a diagrammatic representation of the three-dimensional proportional navigation system of the present invention.
Figure 2:
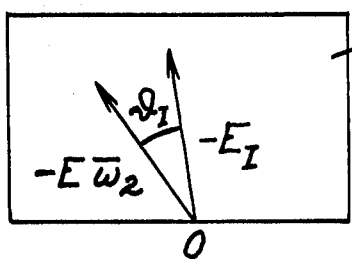
FIG. 2 is a plan view of the auxiliary plane B of FIG. 1.

The spatial relations of the new steering method are shown in FIGS. 1 and 2 of the drawing. In FIG. 1 all values which carry subscripts 1 or 2 relate to the target or to the steered object (the aircraft or torpedo). $V_1$ and $V_2$ are the velocity vectors of the target and of the steered body. $\delta_1$ and $\delta_2$ the angles between $V_1$ and $V_2$ with the line of sight $r$. $\epsilon_2$ is the angle between $V_2$ and $W_r$, where $W_r$ is the lateral velocity of the line of sight $r$, namely the velocity with which the end of the vector $r$ moves transversely to itself. Such a movement of the line of sight $r$ always occurs necessarily whenever the actual path vector $V_2$ deviates from the corresponding collision vector $V^*_2$. The path vector of the target $V_1$ and the collision vector $V^*_2$ lie in an adjacent plane A, which is also the picture area of FIG. 1. The actual path vector $V_2$ does not lie in plane A but somewhere in the space in front of plane A. The vector $V_2$ therefore has its end directed laterally above to the left from the collision course area A. The vector $V_2$ forms with the line of sight $r$ the principal plane I, and with its associated vector $W_r$ forms the principal plane II. Both principal planes lie in FIG. 1 in front of the auxiliary plane A. The plane of rotation which is to be located is the plane which is formed by vectors $V_2$, $V^*_2$ and the additional vector which connects the end of vector $V_2$ with the end of vector Z.

Figure 3:
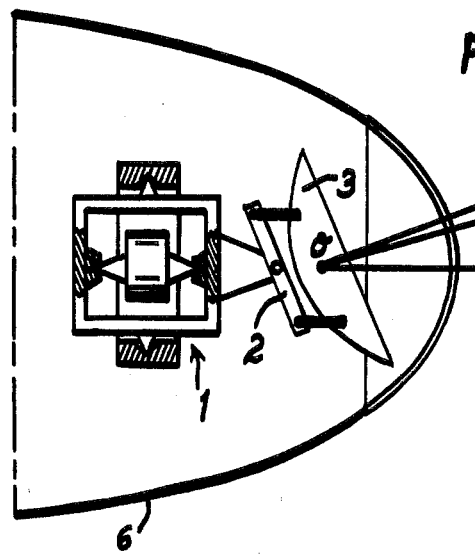
FIG. 3 is the homing-head flow diagram of the apparatus useful with the present invention.

FIG. 3 is a homing-head flow diagram similar to the diagram appearing at page 58 in the book of C. Clemow, supra. In FIG. 3, 1 is a gyroscope with its torque motors and position pick offs, 2 is the adjusting motor, 3 is the antenna, and 6 is the front part of the steered body.

Figure 3A:
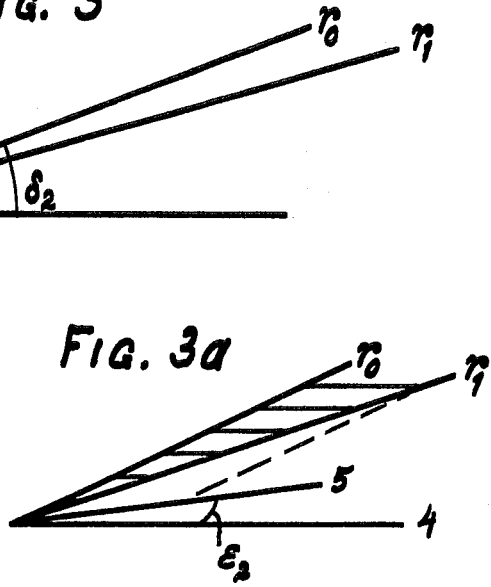
FIG. 3a is a diagrammatic representation of the three-dimensional relationships of FIG. 3.
Figure 4:
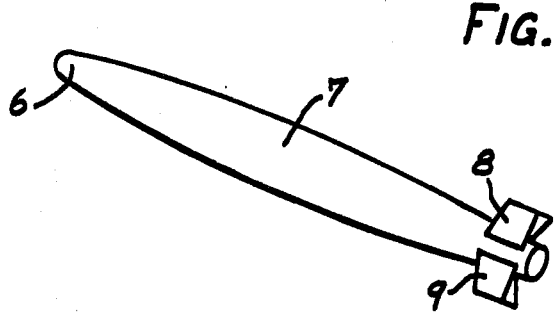
FIG. 4 shows in perspective a missile having a cross-shaped steering mechanism for carrying out the present invention.

In FIGS. 3 and 3a, 4 is the longitudinal axis of the steering body, $r_o$ is the scanning direction of the homing-head at the time $t=t_o$, $r_1$ is the scanning direction of the homing-head at the time $t=t_1$, 5 is a perpendicular to $r$ in the plane $r_o, r$, and $\epsilon_2$ is the same as in FIG. 1.

Figure 4A:
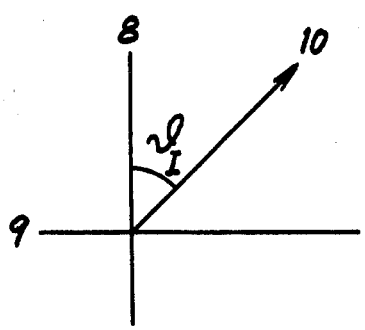
FIG. 4a shows in elevation the relationships of FIG. 4.

In FIGS. 4 and 4a, 7 is the missile being steered, 8 is the vertical rudder, 9 is the horizontal rudder and 10 is the position of the turning axis when 8 is perpendicular to the main plane I. $\zeta_I$ is the same as in FIGS. 1 and 2. The vertical rudder is displaced about the axis 8 by an amount $k_M \cdot W \cdot \cos \zeta_I$ and the horizontal rudder is displaced about the axis 9 by an amount $k_M \cdot W \sin \zeta_I$.

If as a result of an initial deviation or a target path maneuver the actual path vector $V_2$ deviates in space from the collision course vector $V^*_2$, the line of sight $r$ and hence also the plane of rotation ($V_2, V^*_2$, Z) will change their positions in space continuously. In order to follow these changing spatial relations continuously by turning the steerable body, it is contemplated by this invention to ascertain continuously the varying positions of the plane of rotation by means of two similarly varying angles, namely the angles $\delta_2$ and $\epsilon_2$ which are simultaneously determined. These angles $\delta_2$ and $\epsilon_2$ can be measured directly in the steerable body which is important for practical reasons.

The angle $\delta_2$ is measured as the angle between the longitudinal axis of the steered body and the arrow direction or line of sight to the target of the homing head. The plane in which $r$ moves is determined by two successive measurements of the arrow direction. In this plane the perpendicular is erected at $o$. The measurable angle between this perpendicular and the longitudinal axis of the steered body is the angle $\epsilon_2$ as shown in FIG. 3a.

The turning of the steered body in its plane of rotation is effected about an axis that is perpendicular to the plane of rotation, so that the turning vector unit $\overline{Ew_2}$ also represents at the same time the so-called positioning vector of the plane of rotation. For determining the rotation of the steered body in the plane of rotation and for determining the position of such plane, it will therefore be sufficient to ascertain the corresponding axis of rotation and the position and direction of the turning vector unit.

Another feature of this invention is the provision from the two principal planes I and II of an auxiliary plane B which contains all possible and determinable axes of rotation of the vector $V_2$. The auxiliary plane B is perpendicular to the principal planes I and II and is, therefore, also perpendicular to the vector $V_2$ extending in the section of the planes I and II. Every straight line in the auxiliary plane B extending outwardly from $o$ therefore represents an axis of rotation about which the vector $V_2$ can be rotated directly. In practice the auxiliary plane B is located in such a manner that on the principal plane I the perpendicular at $o$ is erected and the plane which is rotatable about such a perpendicular as an axis, will be positioned in such a manner that $V_2/|V_2|$ will be the positioning vector of the plane B.

$V_2/|V_2|$, the unit vector from $V_2$, is equal to the vector $V_2$, divided by the value of the vector $|V_2|$. The unit vector which stands perpendicular to a plane is designated as the positioning vector. Now in order to find among the many possible axes of rotation of $V_2$ which pass through $o$, the one which would impart to the vector $V_2$ a rotation in the plane $(V_2,V^*_2,Z)$ the angle $\zeta_I$ is located with the perpendicular to the main plane I in the plane B. The free leg of this angle determines completely and with certainty the position of the axis of rotation $\underline{Ew_2}$. The angles $\delta_2$ and $\epsilon_2$ change their sizes and positions in space whenever there is a change in the position of $r$. The angle $\zeta_I$ in the auxiliary plane B will also have its size continually changed thereby. These variations will ensure that the steering will be kept continually and directly adjusted to the prescribed spatial relationship.

The auxiliary plane B is shown in FIG. 1 as being in front of the auxiliary area A. For a clearer showing, the auxiliary plane B is again shown in FIG. 2 where the auxiliary plane B is in the plane of the paper. The rotational unit vector $\underline{Ew_2}$ around which the rotation of $V_2$ occurs has its point directed to O, but for simplicity the corresponding negative vector $-\underline{Ew_2}$ with its point directed away from $O$ is shown in FIG. 2. With a rotational vector $\underline{Ew_2}$ which points to $O$, the rotation is in the direction of a right-hand helix so that the vector $V_2$ will be rotated toward $V^*_2$. FIG. 2 also shows that the plane of rotation $(V_2,V^*_2,Z)$ lies between the two principal planes I and II, in accordance with the prescribed conditions. $-\underline{Ew_2}$ is the vector which is displaced 180° from the vector $\underline{Ew_2}$.

The rotation of the velocity vector $V_2$ in the plane of rotation that is prescribed by this invention occurs in such a manner that the angular velocity $w_2$ of the velocity vector $V_2$ will be proportional to the angular velocity $w$ of the line of sight $r$, so that just as in proportional navigation $w_2=k_M w$. It is therefore advantageous to compensate initial deviations as quickly as possible with an immediately increased navigation factor $k_M$ but to return the navigation factor to its normal value again before the limit of stability is exceeded. The general known principles of proportional navigation are explained for example by Richard B. Dow, supra.

As can be seen from the description of the Figures, this invention requires only an orientation and coordination system which is carried by the steered body and not one which is fixedly positioned in space. This feature is an important advantage which the present invention offers over the now customary spatial steering methods by which the steering is effected by two partial operations, the one operating in a horizontal plane and the other in a vertical plane, both planes being stationary.

For the performance of this invention, the apparatus of FIGS. 3, 3a, 4 and 4a is useful.

In the steered body, in addition to the measurements of the angular velocity $W$ of the line of sight, the two angles $\delta_2$ and $\epsilon_2$ are also measured. In an auxiliary device the perpendicular is located on the principal plane I which can be located immediately with the longitudinal axis of the steered body and the line of sight. In the plane B which is perpendicular to the longitudinal axis of the body and which also naturally contains the perpendicular to the principal plane I, the angle $\zeta_I$ which is calculated from the angles $\delta_2$ and $\epsilon_2$ is positioned on said perpendicular, whereby axis of rotation $\underline{Ew_2}$ is located in position and direction. Since this axis of rotation with the plane B is always perpendicular to the longitudinal axis of the body, it will be possible to begin turning in the correct turning plane $(V_2,V^*_2,Z)$. After measurement of the angles $\delta_2$ and $\epsilon_2$ the predictable behavior of the target and steered body is calculated with the help of a calculator with parameter variation of $\zeta_I$. The most favorable values of $\zeta_I$ are taken and are used for determining the turning axis i.e., so that the rotation of the guided missile is carried out about an axis determined by the means of angle $\zeta_I$ in such a way that the velocity vector of the guided missile $V_2$ is moved directly toward the collision vector $V^*_2$. The turning of the steered body in the correct plane of rotation is initiated and carried out by a corresponding displacement of the rudder, hence by a steered body with cross-shaped control mechanism, by simultaneous displacement of two rudders, as shown in FIGS. 4 and 4a.

Another important advantage of this invention is that for beginning the correct turning, there will not be required any initial maneuvers or any swinging of steered body into the plane of rotation, but that after measurement of the values, $W$, $\delta_2$, $\epsilon_2$, and after calculation of the value of $\zeta_I$, it will be possible to begin with the turning in the correct rotation plane.

With a steered body that is equipped with a cross-shaped steering mechanism, the direct turning in the correct plane is effected in such a manner that the angular velocity vector $\underline{Ew_2}$, in accordance with the momentary and accidental positioning of the steering mechanism, will be divided into two components corresponding to the positioning of the said steering mechanism, and that the two angular velocity components are determined according to the cosines of the angles between $\underline{Ew_2}$ and the two arcs of the steering mechanism. In aircraft a distinction is made between "cross-filter" and "level-flier." A cross-flier has two materially perpendicular turning axes about each of which a steering mechanism can be turned, as shown in FIGS. 4 and 4a.

With a steered body whose main steering mechanism lies in a plane, the steered body is first rolled about its longitudinal axis until its axis of rotation $\underline{Ew_2}$ is in the plane of the steering mechanism and the latter can be swung about said axis. Immediately thereafter the turning of the steered body in the correct plane $(V_2, V^*_2,Z)$ is commenced.

The method of this invention is exact and dependable under all conditions, so that it can also be used in extreme emergencies. It is applicable not only to aircraft and torpedo steering, but also for use during the final stage of spatial navigation.

It will be understood that this invention is susceptible to modification in order to adapt it to different usages and conditions and, accordingly, it is desired to comprehend such modifications within this invention as may fall within the scope of the appended claims.

I claim:

1. An orientation and coordination system adapted to be carried by a steered body for directing the steered body to a target, said steered body having a homing head, the longitudinal axis of said steered body and homing head being coincident, and a line of sight from said steered body to a target being characterized as the direction from the homing head on said steered body to the target, wherein the manner of steering is such that the angular velocity of the changing velocity vector of the steered body is proportional to the angular velocity of the closing line of sight during body flight, comprising in the steered body:

a. means for continuously measuring the instantaneous changes of the angle designated as $\delta_2$ existent between the velocity vector designated as $V_2$ of the steered body and the line of sight designated as $r$ during flight of the steered body;

b. means for continuously measuring the changing angle designated as $\epsilon_2$ existent between the velocity vector $V_2$ of the steered body and the lateral velocity of the line of sight;

c. means for measuring the angular velocity of the line of sight;

d. means for computing an angle designated as $\zeta_I$ from $\delta_2$ and $\epsilon_2$, wherein said angle $\zeta_I$ is formed with a perpendicular in an auxiliary plane designated as B which contains said perpendicular and is itself perpendicular to $V_2$, said perpendicular located in a principal plane designated as I and having an origin through the line of sight, said principal plane I being defined by $V_2$ and the line of sight; and e. means for continuously guiding the steered body about the axis that is positioned by the angle $\zeta_I$.

2. The apparatus of claim 1, wherein said steered body has a cruciform control mechanism and means for providing steering control of said steered body, corresponding to the relationship provided by the operation of dividing the angular velocity vector into two components corresponding to the two guide arcs and determining the two turning components by the cosines of the angles between said angular velocity vector and the two arcs of the control mechanism.

3. The apparatus of claim 1, wherein said steered body has a steering mechanism comprising control elements positioned for operation in a common plane and has means for first rotating said body about its longitudinal axis until its turning axis lies in the aforementioned common plane of the control elements of the steering mechanism, and means for swinging the steering mechanism about the axis of rotation and turning said steered body in the plane of rotation.

4. In an orientation and coordination system adapted to be carried by a steered body for directing the steered body to a target, said steered body having a homing head, the longitudinal axis of said steered body and homing head being coincident, and a line of sight from said steered body to a target being characterized as the direction from the homing head on said steered body to the target, wherein the manner of steering is such that the angular velocity of the changing velocity vector of the steered body is proportional to the angular velocity of the closing line of sight, the method of operating the apparatus comprising locating the position and direction of the angular velocity vector relative to the plane of rotation of the velocity vector of the steered body containing the velocity vector designated as $V^*_2$ of the collision course, and pursuing the actual course with the least possible repositioning of the steered body along the collision course to the target.

5. The method of claim 4, wherein the plane of rotation of the velocity vector of the steered body is established continuously by measuring the two variable angles designated as $\delta_2$ and designated as $\epsilon_2$, $\delta_2$ being the angle between the velocity vector $V_2$ and the line of sight designated as $r$, while $\epsilon_2$ is the angle between the velocity vector $V_2$ and the lateral velocity of the line of sight, and continuously adjusting the control of said steered body relative to said plane of rotation in accordance with conditions occurring with variable spatial events influenced by starting errors of said body, and target path variations relative to maneuvers.

6. The method of claim 5, wherein the steering in accordance with rotation of the velocity vector in the plane of rotation occurs about an axis of rotation which is perpendicular to said plane.

7. The method of claim 6, wherein the axis of rotation which is directed to the plane of rotation is contained in an auxiliary plane designated as B which is itself perpendicular to two principal planes designated as I and designated as II, and in that the principal plane I is formed by the velocity vector $V_2$ of the steered body and the line of sight $r$, the principal plane II being formed by the velocity vector $V_2$ of the steered body and the lateral velocity vector of the line of sight.

8. The method of claim 7, wherein the angle designated as $\zeta_I$, which lies in the auxiliary plane B and is formed between the present turning axis and the perpendicular to principal plane I is continually computed from the two variable angles $\delta_2$ and $\epsilon_2$ and therefore the position of the axis of rotation and of the plane of rotation are continually adjusted to the changing events in space.

9. The method of claim 8, wherein the proportionality factor designated as $k_M$ for determining the amount of steering is chosen relatively large at the beginning of the path, and is reduced to its normal amount when the target is approached.